United States Patent [19]

Onaka et al.

[11] Patent Number: 5,077,457

[45] Date of Patent: Dec. 31, 1991

[54] METHOD OF AUTOMATICALLY FEEDING WIRE TO AN ELECTRIC DISCHARGE MACHINE

[75] Inventors: Takemoto Onaka, Munakata; Yoshitada Matsuo, Fukuoka, both of Japan

[73] Assignee: Seibu Electric & Machinery Co., Ltd., Fukuoka, Japan

[21] Appl. No.: 440,943

[22] Filed: Nov. 24, 1989

[30] Foreign Application Priority Data

Dec. 28, 1988 [JP] Japan .................. 63-298396

[51] Int. Cl.⁵ .................................................. B23H 7/10
[52] U.S. Cl. ............................... 219/69.12; 219/69.17
[58] Field of Search ......................... 219/69.12, 69.17

[56] References Cited

U.S. PATENT DOCUMENTS

| 4,338,505 | 7/1982 | Katsube et al. ............ | 219/69.12 |
| 4,598,189 | 7/1986 | Inoue et al. ............... | 219/69.12 |
| 4,652,716 | 3/1987 | Schneider et al. ......... | 219/69.17 |
| 4,778,972 | 10/1988 | Josserand ................... | 219/69.12 |

FOREIGN PATENT DOCUMENTS

| 311918 | 4/1989 | European Pat. Off. ...... | 219/69.12 |
| 3236263 | 4/1983 | Fed. Rep. of Germany . | |
| 141490 | 11/1979 | Japan .......................... | 219/69.12 |
| 58-132421 | 8/1983 | Japan .......................... | 219/69.12 |
| 205230 | 11/1984 | Japan .......................... | 219/69.12 |
| 293724 | 12/1986 | Japan .......................... | 219/69.17 |
| 62-16771 | 4/1987 | Japan . | |
| 1-106128 | 7/1989 | Japan . | |

2066717 7/1981 United Kingdom .

OTHER PUBLICATIONS

*Wire-Cut Electric Discharge Machining Apparatus* (Patent Abstract), vol. 10, No. 134 (M-479) (2191) 5/17/1986 & Jp-A-60 259330, Mitsubishi Denki K. K.

*Primary Examiner*—Geoffrey S. Evans
*Attorney, Agent, or Firm*—Browdy and Neimark

[57] ABSTRACT

A method of automatically feeding wire to an electric discharge machine, wherein when the wire electrode is broken during when the wire electrode is effecting the discharge machining for the work according to a predetermined machining profile, the wire electrode is passed through a worked slit via a feed pipe at a position of the worked slit at the frontmost portion of machining for the work by the wire electrode or at a position which is slightly returned back from the frontmost portion along the machining profile without returning the wire feed pipe to the position of start hole that is perforated in advance in the work, and the discharge machining is executed again by the wire electrode for the work making it possible to greatly improve the machining efficiency. Prior to passing the wire electrode in the worked slit formed in the work, furthermore, an electric current is supplied to the wire electrode to anneal it in order to remove internal stress from the wire electrode and to extent it straight, such that the wire electrode can be inserted in the worked slit of the work easily and quickly.

12 Claims, 8 Drawing Sheets

METHOD OF AUTOMATICALLY FEEDING WIRE TO AN ELECTRIC DISCHARGE MACHINE

BACKGROUND OF THE INVENTION

1. Field of the Invention

The present invention relates to a method of automatically feeding a wire to an electric discharge machine which effects the discharge machining to a work by giving an electric discharge energy between the work and a wire electrode.

2. Description of the Prior Art

In a conventional electric discharge machine, for example, the work such as a super hard alloy and a hardened steel are machined using a portion where the wire electrode runs, and the wire is usually fed by an automatic wire feeding device. Conventional automatic wire feeding devices can be divided into those of a pipe guide system, those of a water stream guide system, and those of a start hole guide system.

FIG. 9 illustrates an automatic wire feeder based on the start hole guide system. The automatic wire feeder according to the start hole guide system is achieved by positioning the wire feeder at a start hole 26 formed in a work 8, penetrating a wire electrode through the start hole 26 via a wire feeder device 28, a feeder pipe and an upper guide 32, and pulling out the wire electrode 1 by the lead rollers located on the downstream side of a lower guide 29. The start hole system has a merit in that the wire can be penetrated even when the start hole 26 has a small diameter as well as a demerit in that the wire electrode itself must be composed of a hard wire.

FIG. 10 illustrates an automatic wire feeder based on the pipe guide system. The automatic wire feeder according to the pipe guide system is achieved by positioning the wire feeder at a start hole 26 formed in the work 8, passing a pipe 27 that works as a guide through the start hole 26, actuating the wire feeder device 28 to pass the wire electrode 1 through the pipe 27, and pulling out the wire electrode 1 by the lead rollers positioned on the downstream side of the lower guide 29. The pipe guide system has a merit in that the feeding of wire electrode can be achieved maintaining a very high success rate as well as a demerit that the start hole 26 must have a large diameter since the pipe 27 that serves as a guide must be passed through the start hole 26.

FIG. 11 illustrates an automatic wire feeder based on the water stream guide system. The automatic wire feeder based on the water stream guide system is achieved by positioning the wire feeder at a start hole 26 formed in the work 8, injecting a working fluid 31 into the start hole 26 through a working fluid guide 30, passing the wire electrode 1 through the start hole 26 that is fed by the wire feeder device 28 accompanying the force of injection of the working fluid 31, and pulling out the wire electrode 1 by the lead rollers positioned at the downstream side of the lower guide 29. The water stream guide system has a problem in that the wire feeding is achieved at a very poor success rate.

According to the above-mentioned systems, however, in case the wire electrode 1 is broken during the discharge machining, the wire electrode 1 is coupled together, i.e., the wire is automatically fed again by necessarily returning the procedure to the start hole 26 which is the start point of machining. That is, feeding of the wire electrode 1 is achieved by moving the work table relative to the wire head to return the wire feeding portion of the wire head to the start hole 26 formed in the work, passing the wire electrode 1 through the start hole 26, and advancing the wire electrode 1 along the machining profile of the work 8 until it reaches the front end of discharge machining. That is, the wire feeding portion must be returned to the start hole 26 every time when the wire electrode 1 breaks. The wire electrode 1 that has passed through the start hole 26 of the work 8 is then advanced along the worked profile that has been discharge machined until it reaches the point from where the machining is to be started. Therefore, the time is waisted and the discharge machining is not efficiently carried out.

A wire breakage detecting device has been proposed for use with the conventional electric discharge machines to detect the breakage of wire in case the wire electrode is broken when it is being fed during the discharge machining. For instance, a wire breakage detecting device used for an electric discharge machine has been disclosed in Japanese Utility Model Laid-Open No. 106128/1989 filed by the applicant of the present application. This wire breakage detecting device will now be briefly described with reference to FIG. 8. Breakage in a wire electrode 1 is detected by a fiber-type photoelectric sensor 85, and the machining power source is cut off in response to a breakage signal of the fiber-type photoelectric sensor 85 to stop the electric discharge machining. The sensor 85 is installed being opposed to a wire that serves as the wire electrode 1 positioned in the wire electrode feeding system, exhibits a function to detect breakage in the wire, and sends a breakage signal to a controller which cuts off the machining power source in response to the breakage signal to stop the electric discharge machining. The sensor 85 may be installed at a position between a roller 87 on the upstream side of an upper wire head 86 and a brake roller 88 arranged on the upstream side of the roller 87 and where no deflection takes place in the wire that serves as the wire electrode 1. In addition to making it possible to smoothly carry out the operation of the electric discharge machine unattended, the automatic wire feeder makes it possible to automatically connect the wire together again even when it is broken during the machining, and exhibits a try-again function which tries to connect the wire together repetitively even when the feeding of wire results in failure until the wire is connected together. The wire electrode 1 supplied from a source bobbin 89 by the automatic wire feeder passes through a variety of rollers, through a dies guide of a wire head 86, subjected to discharge machining the work, passes through a dies guide of a wire head 90 and rollers, taken up by a take-up roller 91, and is taken up by a take-up reel or is discharged onto a used wire storage unit.

Another wire breakage detecting device has been disclosed in Japanese Patent Application No. 221416/1988 that was filed by the applicant of the present application. The wire breakage detector device is arranged in the wire electrode running system that guides the wire electrode, and comprises a roller that rotates in response to the running of the wire electrode, a revolution sensor which is opposed to the roller to detect the number of revolutions of the roller, and a controller which detects whether the revolution signals of the roller as detected by the revolution sensor lie within a predetermined range or not, and which cuts off the machining power source in response to an abnormal signal in the detect signals to interrupt the machining of the work.

Japanese Patent Publication No. 16771/1987 discloses a further line breakage detecting device which comprises a first detecting means for detecting an average value of peaks in the machining voltage, a second detecting means for detecting an instantaneous value of said machining voltage, and a comparator means which compares the value detected by the first detecting means with a value detected by the second detecting means, and which produces a signal for cutting off said power source when the instantaneous value becomes greater than the average peak value by more than a predetermined amount.

SUMMARY OF THE INVENTION

The object of the present invention is to solve the above-mentioned assignments and to provide a method of automatically feeding wire in order to automatically feed a wire electrode to a machining hole in a work by using an automatic wire feeder provided for an electric discharge machine wherein when a breakage in the wire electrode is detected during when the wire electrode is effecting the discharge machining for the work according to a predetermined machining profile, the wire electrode is passed through a worked slit and is automatically fed or is connected at a position where the wire is broken, i.e., at a position of the worked slit at the frontmost portion of machining for the work by the wire electrode or at a position which is slightly returned back from the point where the wire is broken along the machining profile without returning the wire feeding port of the wire head back to the position of start hole that is perforated in advance in the work. Therefore, the discharge machining is executed again by the wire electrode for the work contributing to greatly improving the machining efficiency.

Another object of the invention is to provide a method of automatically feeding wire to automatically feed a wire electrode to the machining hole of a work, wherein an electric current is permitted to flow into the wire electrode to anneal it in order to remove internal stress existing in the wire electrode prior to passing the wire electrode through the worked slit formed in the work, the wire electrode is elongated into a straight form, and the wire electrode is passed through the worked slit of the work easily and quickly. That is, a feeder pipe is lowered down to the wire feeding port of the upper wire head, the feeder pipe containing passing therethrough the wire electrode that was annealed and elongated by supplying a current thereto through feeder pins provided for the anneal rollers and common rollers. Therefore, the tip of the wire electrode is exposed only slightly, and the wire electrode downwardly extends straight. The wire electrode is lowered by the wire feed rollers toward the worked slit of a machining profile of the work at a point where the wire is broken, and is permitted to pass through smoothly, reliably and quickly.

A further object of the present invention is to provide a method of automatically feeding wire to an electric discharge machine comprising:

a step for stopping the relative movement of a work table and a wire head in response to a break signal of the wire electrode produced by a wire breakage sensor during the electric discharge machining;

a step for taking up the wire electrode of the broken side to remove it, and for annealing the wire electrode of the feeding side to extend the wire electrode straight;

a step for cutting the tip of the wire electrode to remove it;

a step for feeding said wire electrode and lowering a feed pipe down to a predetermined position;

a step for actuating a wire feed roller to insert said wire electrode in a worked slit which is a worked hole of a machining profile at a point where the wire is broken in the work; and a step for pulling out said wire electrode that has passed through said worked slit using the lead rollers.

Still further object of the present invention is to provide a method of automatically feeding a wire to an electric discharge machine comprising:

a step for stopping the relative movement of a work table and a wire head in response to a break signal of the wire electrode produced by a wire breakage sensor during the electric discharge machining;

a step for taking up the wire of the broken side to remove it, and for annealing the wire of the feeding side to extend the wire electrode;

a step for cutting the tip of the wire electrode to remove it;

a step for feeding said wire electrode and lowering a feed pipe down to a predetermined position;

a step for slightly moving back the wire feeding port of said wire head from the worked hole or from the worked slit where the wire is broken along the worked profile;

a step for actuating a wire feed roller to insert said wire electrode in a worked slit of a machining profile;

a step for inserting said wire electrode that has passed through said worked hole in a lead roller; and a step for advancing said wire electrode to a discharge machining portion along the worked profile, i.e., along the worked slit.

Yet further object of the present invention is to provide a method of automatically feeding a wire to an electric discharge machine wherein an electric current is supplied to a wire electrode through feeder pins provided for the annealing rollers and for the common rollers in order to anneal the wire electrode of the feeding side and to extend said wire electrode, such that the feed pipe of said wire electrode is lowered down to the wire head, and wherein said annealing roller is driven to slowly feed said wire electrode and to insert said wire electrode in the worked slit of a machining profile at which the wire is broken in the work, and said wire electrode is extended straight such that said wire electrode is inserted in said machining hole reliably and quickly even when the worked slit is narrow at a point where the wire is broken in the work.

A further object of the present invention is to provide a method of automatically feeding a wire to an electric discharge machine wherein a wire feeding port of a wire head is slightly moved back from the worked slit where the wire is broken along a worked profile, and the wire feed rollers are driven to pass the wire electrode through the worked slit of a machining profile, such that the end of said wire electrode is not impaired by the edge of the work at which the wire is broken and that the wire electrode can be smoothly inserted in the worked hole or in the worked slit contributing to greatly improving the success rate of the wire feeding or wire connection. That is, the wire feeding port of the wire head is set at a position slightly returned back, e.g., returned back by about 0.3 mm from the worked hole at which the wire is broken along the worked profile, and the annealing rollers are driven to pass said wire electrode in the worked hole of the machining profile. Therefore, the tip of the wire electrode is not impaired by the edge of the work at which the wire is broken, and the wire electrode is smoothly inserted in the worked hole or in the worked slit contributing to greatly improving the success rate of wire feeding or wire connection.

When the wire electrode is broken during the discharge machining by the electric discharge machine, the broken wire electrode is resorted by a conventional automatic wire feeder by returning the procedure back to the start hole, i.e., by returning the procedure back to the working point along the worked profile that has been discharge machined already. According to the method of automatically feeding the wire, on the other hand, the broken wire is restored by feeding the wire electrode to the point where the wire is broken or to the worked hole at a point slightly returned back from the point where the wire is broken. Therefore, the broken wire is restored within very short period of time and reliably, making it possible to greatly improve the efficiency for automatically feeding the wire or for electric discharge machining. Furthermore, the wire is automatically fed by an NC apparatus, and the electric discharge machine is controlled nonattended.

DETAILED DESCRIPTION OF THE EMBODIMENT

Described below in conjunction with the drawings is a method of automatically supplying wire to an electric discharge machine according to an embodiment of the present invention.

Figure 1:
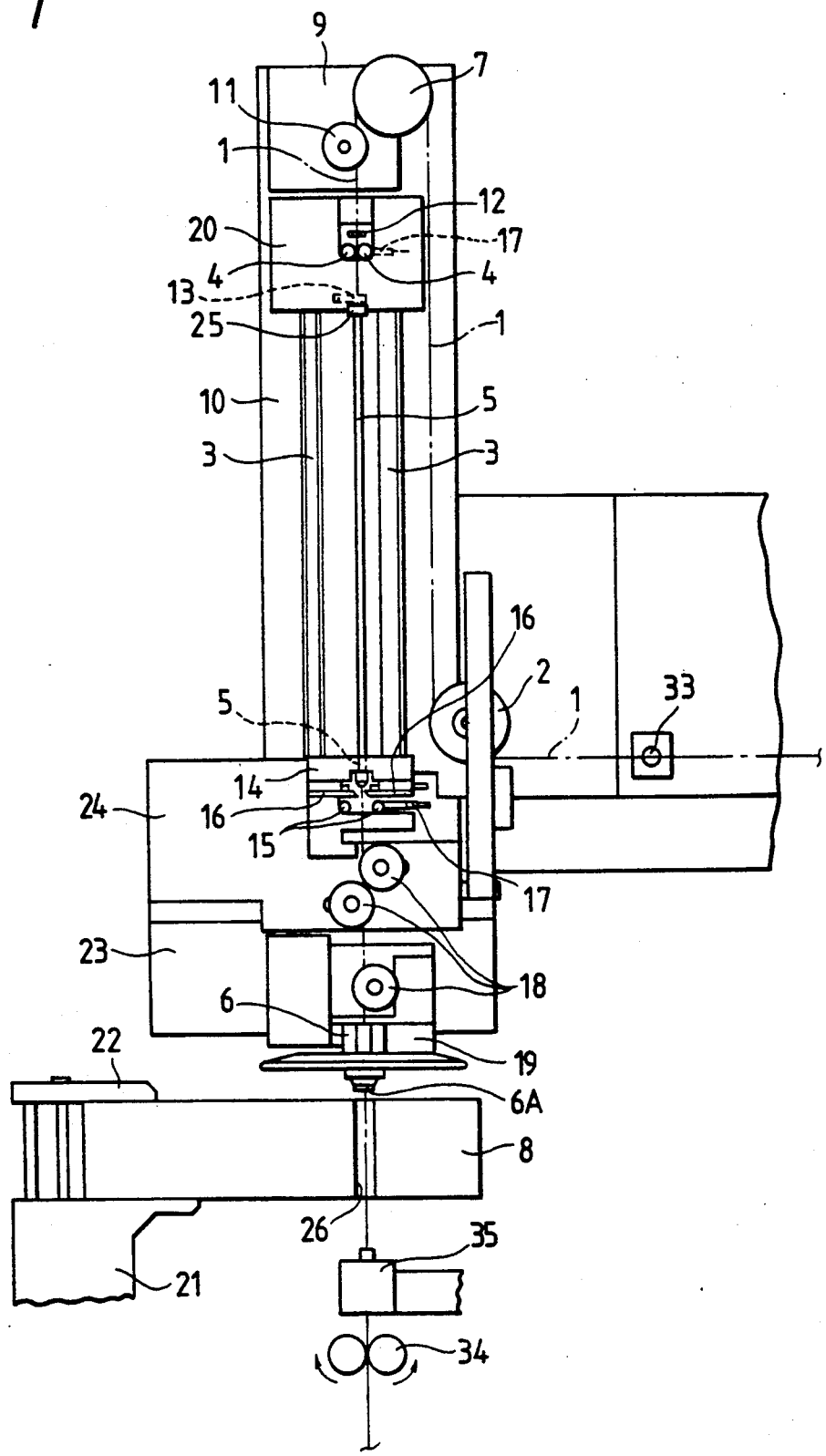
FIG. 1 is a front view illustrating an embodiment of an electric discharge machine for achieving the method of automatically feeding wire according to the present invention.
Figure 2:
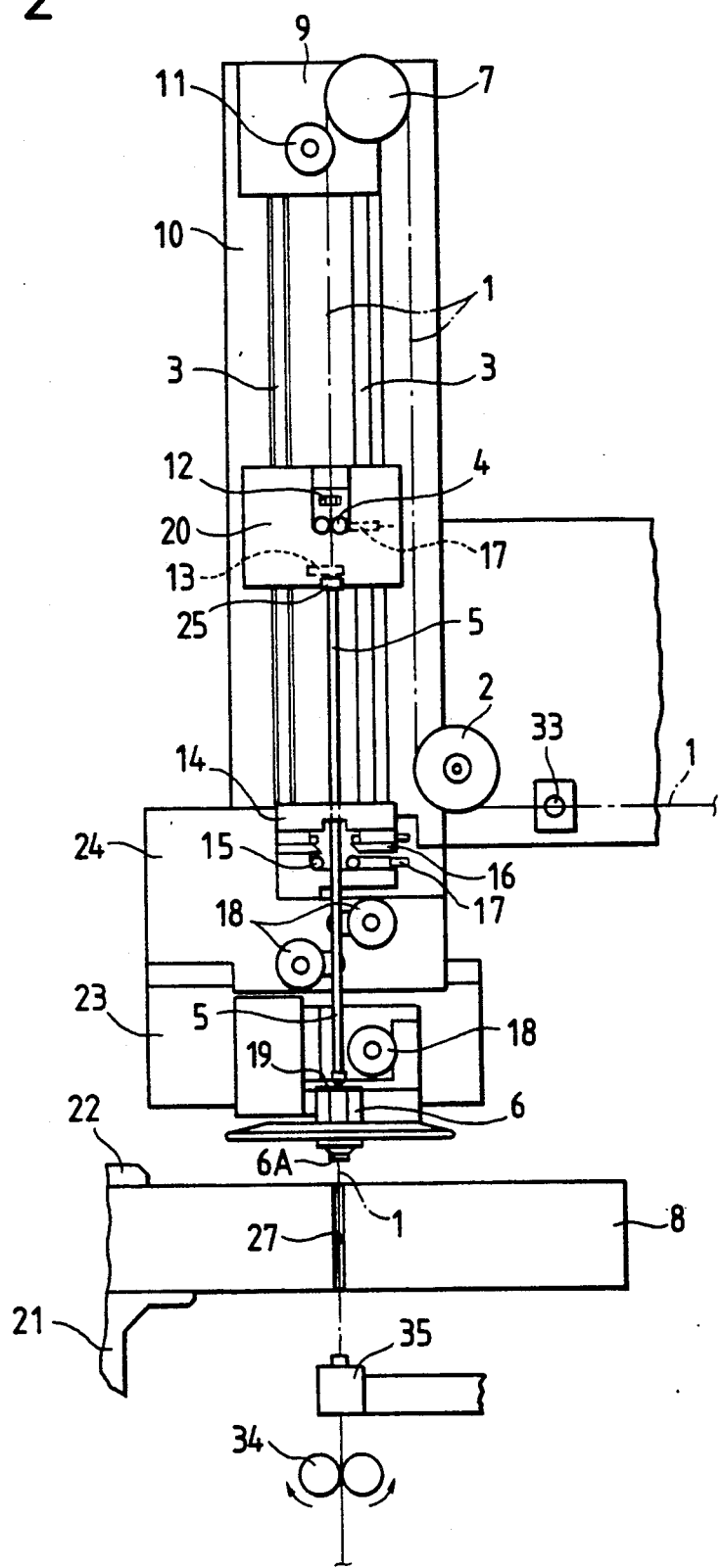
FIG. 2 is a schematic front view illustrating the steps for automatically feeding the wire in FIG. 1.

FIG. 1 is a front view illustrating an electric discharge machine for achieving the method of automatically feeding wire according to the present invention, and FIG. 2 is a front view which schematically illustrates the condition where the wire is fed in the electric discharge machine.

The electric discharge machine shapes a work 8 into a desired profile using a wire electrode 1. A head 10 that constitutes the electric discharge machine is provided with an automatic wire feeder. The work 8 is fastened by a cramp 22 onto a work table 21 mounted on a cross slide that is actuated by a servo motor through a servo mechanism. On the head 10 of the electric discharge machine is mounted a support member 9 that constitutes the automatic wire feeder, and under the head 10 is secured a support member 24 which mounts a support member 23 with an upper wire head 6 and rollers 18 that guide a feed pipe 5 and the wire electrode 1. A pair of guide rods 3 are arranged between the support member 9 and the support member 24. On these guide rods 3 is mounted a holder 20 to slide in the up and down directions. Onto the holder 20 is fastened a feed pipe 5 that guides the wire electrode 1 using a screw 25 or the like, and are further mounted a thread guide 12, a pair of annealing rollers 4 with a feeder pin 17, and a pipe holder 13. The pair of annealing rollers 4 hold the wire electrode 1 that is fed through the thread guide 12 mounted on the holding member 20, and feeds it into the feed pipe 5, into a start hole 26 (see FIG. 1) formed in the work 8, and into a worked hole 27 (see FIG. 2) which is a narrow worked slit that will be described later and that is formed in the work 8 by the discharge machining. The annealing rollers 4 are provided with a feeder pin 17 for supplying an electric current to the wire electrode 1 via the annealing rollers 4. On the support member 9 are mounted a direction changing roller 7 and a felt brake roller 11, and the wire electrode 1 is fed into the feed pipe 5 while a predetermined tension is given thereto. Further, a slide rail 14 is fastened to the support member 24 mounted on the head 10 so that the feed pipe 5 can be smoothly slid. A cutter 16 is installed in the support member 24 under the slide rail 14 adjacent thereto.

The cutter 16 cuts the wire electrode 1 to trim the tip of the wire electrode 1 so that the wire electrode will have a good tip. That is, the cutter 16 has a function to trim the tip of the wire electrode 1 so that it is inserted in the start hole 26 to machine the work 8 into a desired shape: the wire electrode 1 is then cut and its tip is trimmed so that it can be inserted in another start hole 26 or in the start hole 26 of another work. In addition to the above-mentioned function, the cutter 16 functions to cut the tip of the wire electrode 1 and to remove it such that the wire electrode can be directly inserted in the machining hole, i.e., in the worked slit formed in the work 8 by the discharge machining that will be mentioned later at the time of inserting the wire electrode in the worked slit 27.

In the support member 24 fastened to the head 10, there are arranged a feeder pin 17, a pair of common rollers 15 for guiding the wire electrode 1 and a pair of rollers 18 under the cutter 16. Further, the support member 23 that is fastened to the head 10 adjacent to the lower surface of the support member 24 is provided with a roller 18 for guiding the wire electrode 1, a pipe stopper 19 that prevents the feed pipe 5 from descending excessively (see FIG. 2), and an upper wire head 6. Though not specifically described, the upper wire head 6 is provided with a wire feeding port 6A, a die guide, an injection nozzle, a feeder terminal, and a feeder terminal holder. The electric discharge machine is provided with the lower wire head 35 which is opposed to the upper wire head 6, and on the downstream side of the lower wire head 35 is provided lead rollers 34 that pull out the wire electrode 1 to give tension thereto.

Figure 8:
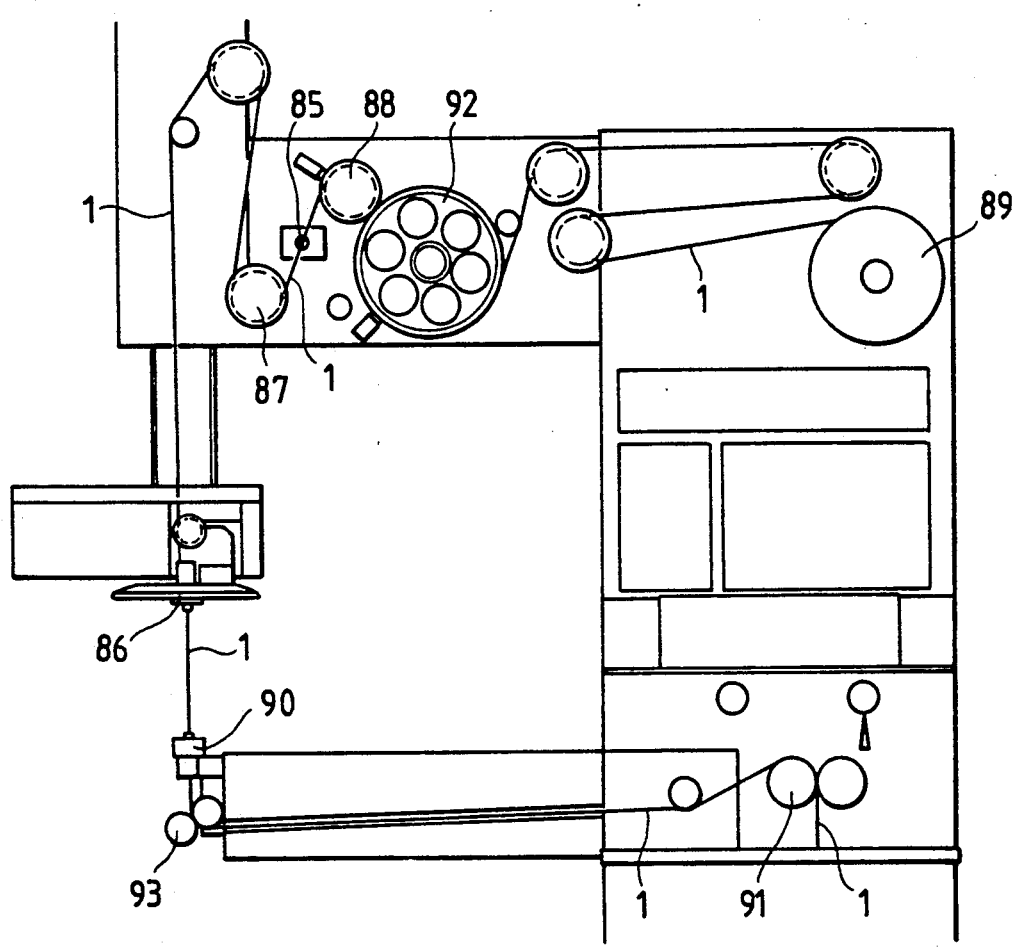
FIG. 8 is a diagram which schematically illustrates a wire breakage detecting device in a conventional electric discharge machine.
Figure 9:
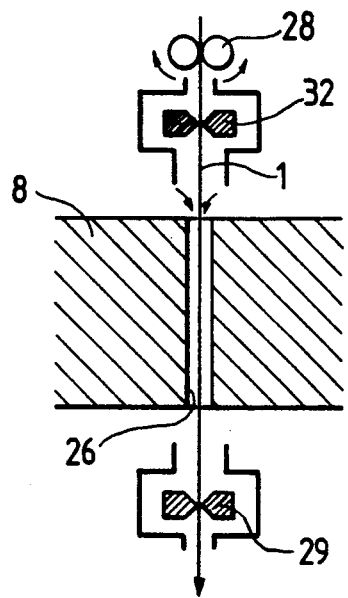
FIG. 9 is a diagram which schematically illustrates a start hole system in a conventional method of automatically feeding wire.
Figure 10:
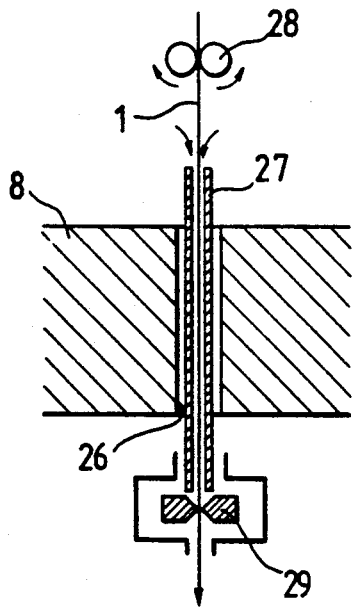
FIG. 10 is a diagram which schematically illustrates a pipe guide system in a conventional method of automatically feeding wire.
Figure 11:
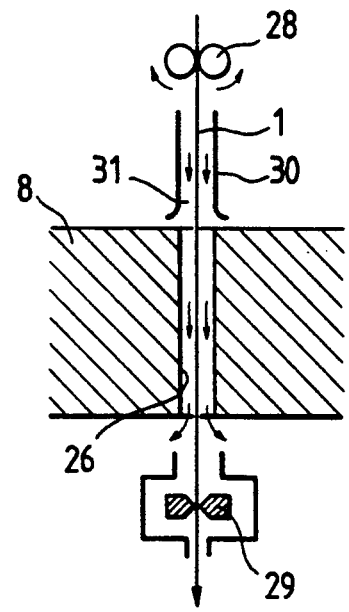
FIG. 11 is a diagram which schematically illustrates a water stream guide system in a conventional method of automatically feeding wire.

The electric discharge machine which is constituted as described above operates in the following way. The wire electrode 1 has been wound on a source bobbin (see prior art of FIG. 8). The source bobbin is loaded to the electric discharge machine, and the wire electrode is delivered from the source bobbin by an automatic wire feeder. In order to feed the wire electrode 1 delivered from the source bobbin 89 to the discharge machining portion, the automatic wire feeder usually has, as shown in FIG. 8, a wire running system which consists of various direction changing rollers, tension rollers 92, brake rollers 88, guide rollers, and lead rollers 93. With regard to the electric discharge machine as shown in FIG. 1, a direction changing roller 2 is positioned on the downstream side of the brake roller 88 (see FIG. 8) in the wire running system. The wire electrode 1 successively passes through the direction changing roller 2, direction changing roller 7, felt brake roller 11, thread guide 12, a pair of annealing rollers 4, feed pipe 5, a pair of common rollers 15, and guide rollers 18, and is fed to the upper wire head 6, and reaches the discharge machining portion of the work 8. Next, the wire electrode 1 passes through the discharge machining portion and the lower wire head 35, through the lead rollers, and through a winding roller 91 shown in FIG. 8, and is exhausted into the storage unit of wire electrode 1.

Prior to inserting the wire electrode 1 in the hole such as start hole 26, the wire electrode 1 that is passed through the pair of common rollers 15 is once held by the annealing rollers 4 and the common rollers 15, a voltage is applied across the feeder pin 17 provided for the annealing rollers 4 and the feeder pin 17 provided for the common rollers 15 and a current is permitted to flow into the wire electrode 1 to anneal the wire electrode 1 so that it can be smoothly inserted in the start hole 26. Due to the annealing, the wire electrode 1 is softened and becomes free from internal stress such as twist and distortion; i.e., the wire electrode 1 is extended straight and is smoothly inserted in the start hole 26 or in the worked slit 27 that will be described later.

FIG. 1 illustrates the case where the tip of the wire electrode 1 is cut and discarded in the electric discharge machine when the ordinary discharge machining is effected, i.e., when the work is machined into a predetermined profile or when the wire electrode is cut using a cutter 16 after having effected the discharge machining into a machining profile with the holder 20 being upwardly moved along the guide rods 3 and the lower end of the feed pipe 5 being positioned over the cutter 16 that is mounted on the support member 24. FIG. 2 illustrates the case where the wire electrode 1 is fed directly into the worked slit 27 formed in the work 8 by the discharge machining in the electric discharge machine when the wire electrode 1 is broken during the discharge machining of the work 8 into a predetermined machining profile or when the wire electrode 1 has been broken at the time of starting the discharge machining with the holder 20 being downwardly moved along the guide rods 3 and the lower end of the feed pipe 5 being positioned on the upper surface of a pipe stopper 19 mounted on the support member 24.

Figure 3:
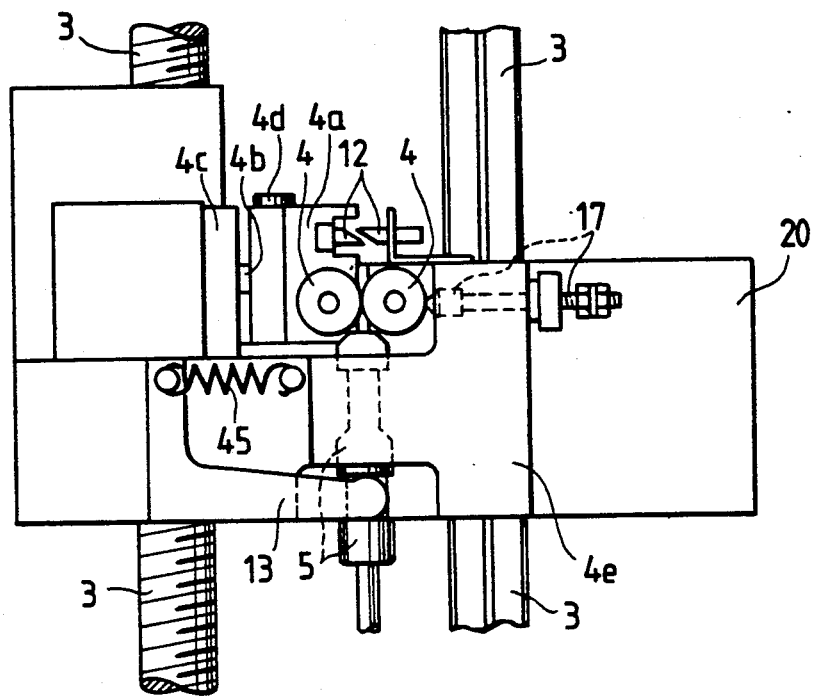
FIG. 3 is a diagram explaining on an enlarged scale a portion where the annealing rollers of FIG. 1 are located.
Figure 4:
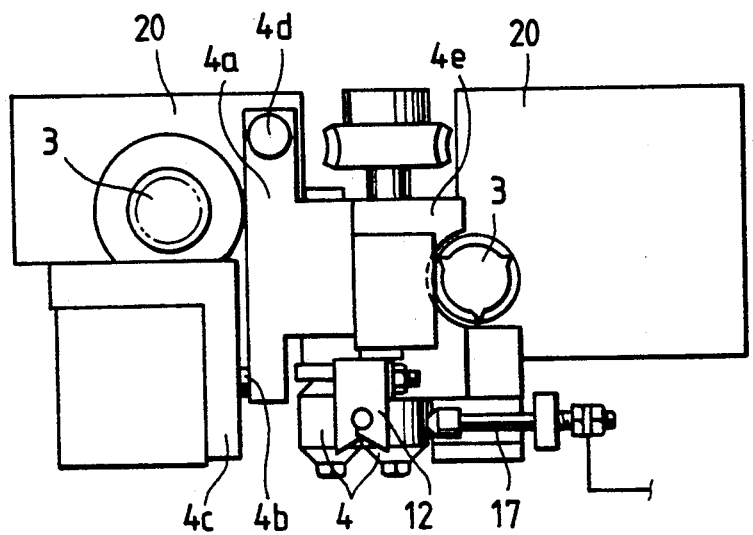
FIG. 4 is a diagram illustrating a device for opening and closing the annealing rollers of FIG. 3.

Described below in conjunction with FIGS. 3 and 4 is an operation for opening and closing the annealing rollers 4 in the electric discharge machine. With reference to a device for opening and closing the annealing rollers 4 as shown, one anneal roller 4 is provided in a fixed manner and is opposed to the feeder pin 17, and the other annealing roller 4 is allowed to be opened and closed. One annealing roller 4 is rotatably supported by a roller holder 4e fastened to the holder 20, and is in contact with the feeder pin 17 which supplies an electric current thereto. The other annealing roller 4 is rotatably supported by a roller holder 4a that is mounted on the holding member 20 to rotate with a shaft 4d as a center. The roller holder 4a is urged by a spring 4f toward a direction to separate away from the roller holder 4e. Therefore, the annealing rollers 4, 4 are usually under the condition to be separated away from each other by the force of a spring. The holder 20 is provided with an air cylinder 4c which works to reciprocally move a piston 4b which comes in contact with the roller holder 4a to rotate it with the shaft 4d as a center. Therefore, the piston 4b is protruded by the action of the air cylinder 4c to turn the roller holder 4a, and whereby the annealing roller 4 rotatably supported by the roller holder 4a comes into contact with the opposing annealing roller 4 overcoming the force of the spring 4f such that the wire electrode 1 is held between the annealing rollers 4 and 4 as it runs passing therethrough.

Figure 5:
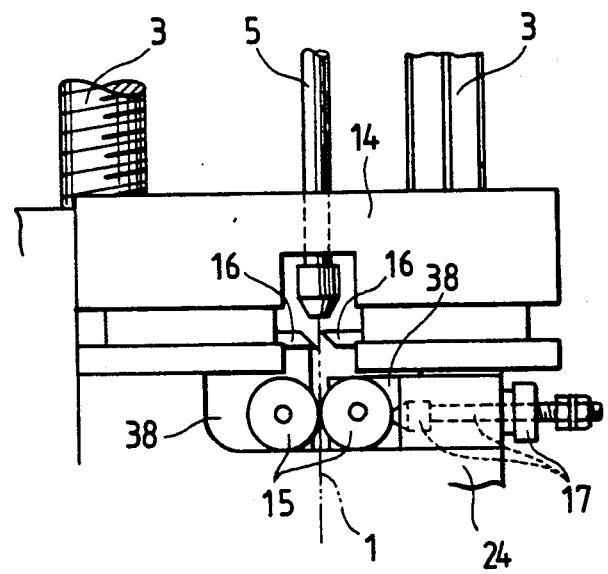
FIG. 5 is a diagram illustrating on an enlarged scale the portions where common rollers and cutter of FIG. 1 are located.
Figure 6:
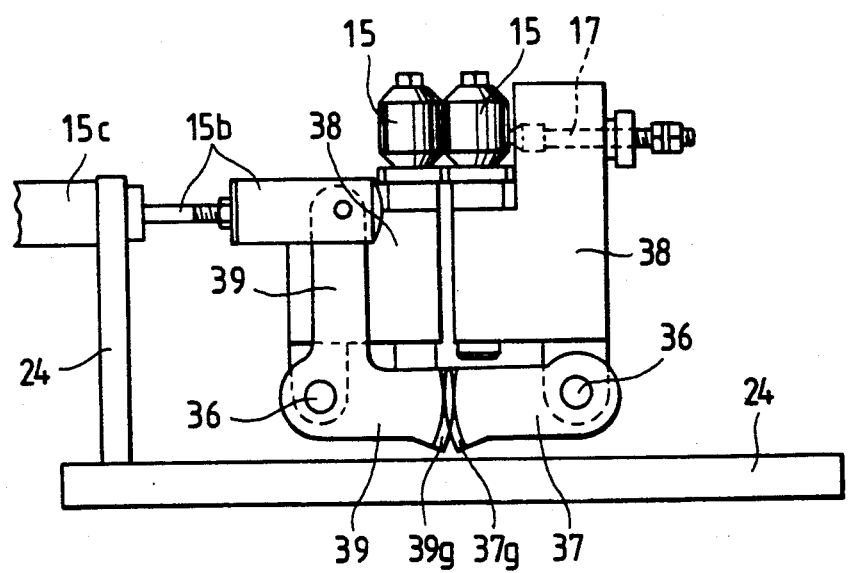
FIG. 6 is a diagram explaining a device for opening and closing the common rollers of FIG. 5.

Described below with reference to FIGS. 5 and 6 is an operation for opening and closing the common rollers 15 and the cutter 16 in the electric discharge machine. Here, the operation for opening and closing the cutter 16 is achieved using the same mechanism as that of the common rollers 15. Therefore, the following description deals with the operation for the common rollers 15 only. As shown, the device for opening and closing the common rollers 15 is so constituted as to open or close both common rollers 15 simultaneously. The pair of common rollers 15, 15 are rotatably supported by roller holders 38 secured to shafts 36 rotatably mounted on the support member 38. The feeder pin 17 is in contact with one common roller 15. The feeder pin 17 supplies an electric current to the common roller 15. To one shaft 36 is fastened a rotary lever 37 with a sector gear 37g, and to the other shaft 36 is fastened an L-shaped rotary lever 39 with a sector gear 39g, the sector gear 37g and the sector gear 39g being in mesh with each other. The support member 24 is provided with an air cylinder 15c which reciprocally moves a piston 15b. On and end of the piston 15b is rotatably mounted an end of the L-shaped rotary lever 3. Therefore, the piston 15b protrudes owing to the action of the air cylinder 15c and the L-shaped lever 39 rotates together with the shaft 36. Turn of the shaft 36 causes one roller holder 38 to rotate. Accompanying the turn of the L-shaped rotary lever 39, the rotary lever 37 is rotated via the sector gear 37g and sector gear 39g. Turn of the rotary lever 37 causes the other roller holder 38 to rotate via the other shaft 36 with this shaft 36 as a center. Therefore, the common rollers 15, 15 that are rotatably supported by the roller holders 38 come into contact with each other and separate away from each other. When the common rollers 15, 15 come into contact with each other, the wire electrode 1 running between the common rollers 15, 15 is held thereby.

Figure 7A:
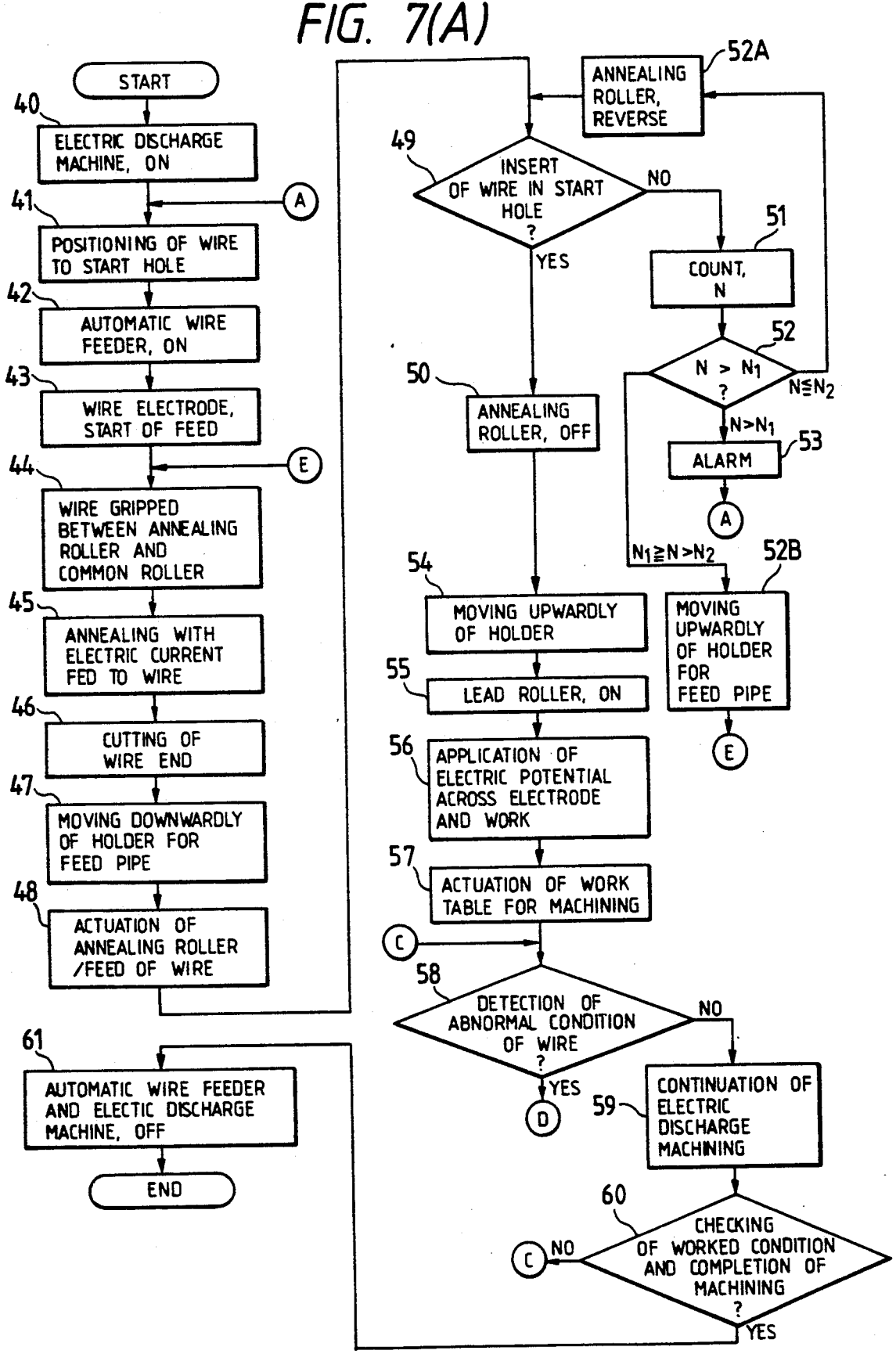
FIGS. 7(A) and 7(B) are flow charts for explaining the operations for achieving the method of automatically feeding wire according to the present invention.
Figure 7B:
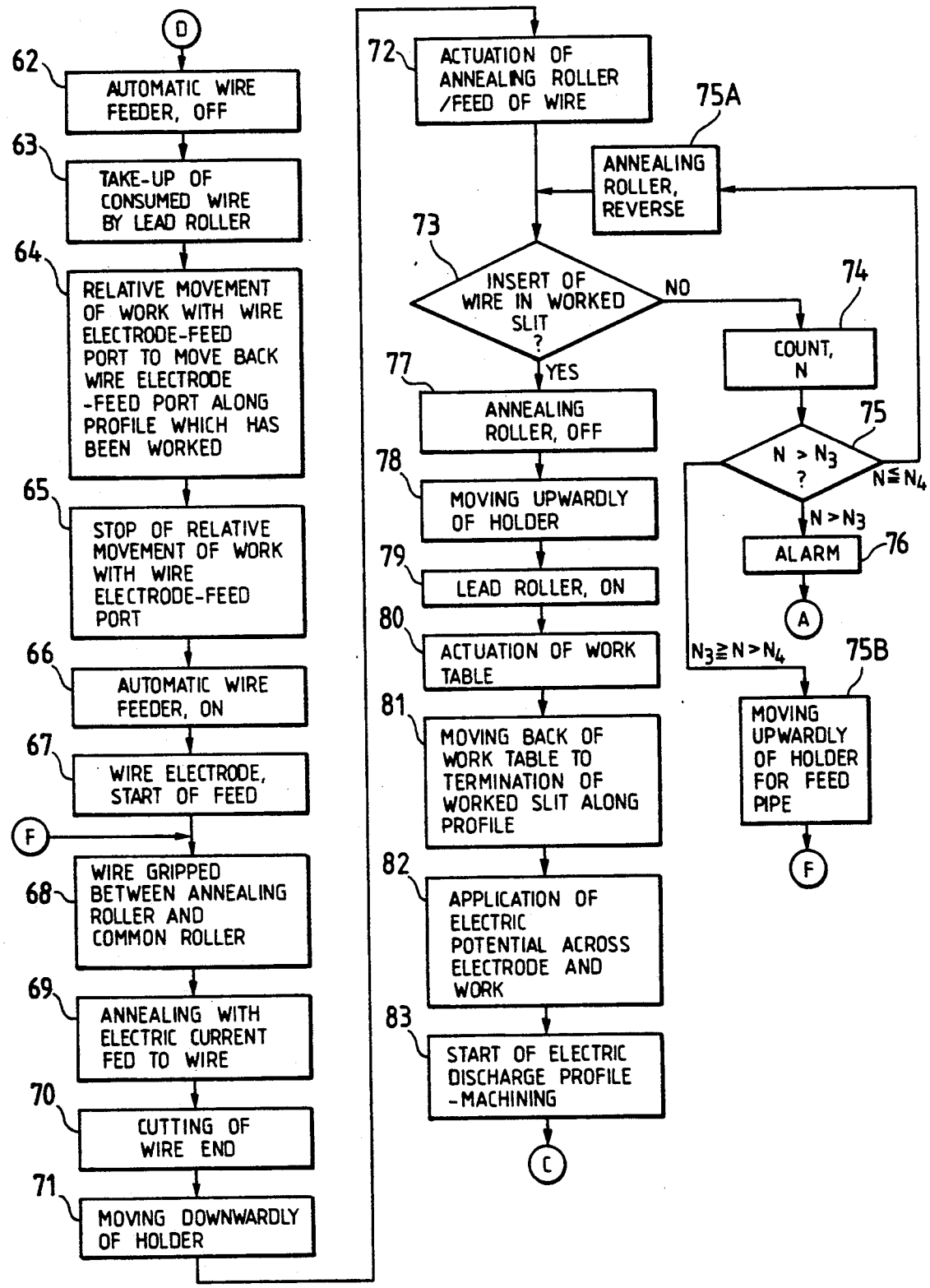

Described below is a method of automatically feeding wire to the electric discharge machine according to an embodiment of the present invention in conjunction with FIGS. 1 to 6 that explain the electric discharge machine and in conjunction with FIGS. 7(A) and 7(B) that are flow charts. This embodiment deals with the case where, when the wire electrode 1 is broken, a port for feeding the wire electrode 1 is slightly returned back from the point of breakage along the worked profile. It is however, also allowable to insert the wire electrode 1 at a position where the wire electrode is broken without returning the wire electrode 1 back along the worked profile. In this case, the steps 64, 65, 80 and 81 should be omitted from the process that will be described later.

First, in order to machine the work 8 by the electric discharge machine, the work 8 in which the start hole 26 is perforated by an aperture discharge machining apparatus or by a start hole machining apparatus is fastened onto a work table 21 by a clamp 22. A main switch, a motor and a servo motor in the electric discharge machine are turned on, and a controller is actuated to achieve the method of automatically feeding the wire to the electric discharge machine (step 40).

The work table 21 is operated by the instruction from the controller and is so controlled that the wire feeding port 6A of the upper wire head 6 is located above the start hole 26 that is formed in the work 8. That is, the motor feed mechanism is actuated to adjust the position of the work table 21 on the cross slide, such that the wire electrode 1 is positioned, i.e., the wire feeding port 6A of the upper wire head 6 is positioned over the start hole 26 of the work 8 fastened to the work table 21. In this case, the feed pipe 5 is at a position shown in FIG. 1 (step 41).

Owing to the operation of the automatic wire feeder, the wire electrode 1 is passed from the source bobbin through various rollers such as tension rollers and direction changing rollers, is fed into the feed pipe 5 via the direction changing rollers 2, 7, felt brake roller 11, thread guide 12, and anneal roller 4, and the tip of the wire electrode 1 is positioned to protrude beyond the lower end of the feed pipe 5 (steps 42, 43).

The pair of annealing rollers 4 provided on the holding member 20 are brought close to each other by actuating the roller opening/closing device, and the pair of common rollers 15 installed on the support member 24 are brought close to each other by actuating the roller opening/closing device, in order to hold predetermined portions of the wire electrode 1 (step 44).

A voltage is applied across the feeder pin 17 provided for the annealing roller 4 and the feeder pin 17 provided for the common roller 15 to supply a current into the wire electrode 1 positioned between the annealing rollers 4 and the common rollers 15. The wire electrode 1 is annealed to remove internal stress possessed by the wire, and is extended to be straight (step 45).

The cutter 16 installed on the downstream side of the feed pipe 5 but on the upstream side of the common rollers 15 is operated to cut the tip of the wire electrode 1 in order to trim the tip of the wire electrode 1 that is annealed, so that the wire electrode 1 is hanged vertically (step 46).

Then, upon instruction from the controller, the common rollers 15 that are close to each other are separated away from each other by actuating the roller opening/closing device so that the lower part of the wire electrode 1 is released. Then, the automatic wire feeder is operated to feed the wire electrode 1, the holder 20 is lowered along the guide rods 3 until the lower end of the feed pipe 5 fastened to the holder 20 comes into contact with the pipe stopper 19 arranged on the upper wire head 6 as shown in FIG. 2, and the descending motion of the holder 20 is stopped at that position (step 47).

The annealing rollers 4 are actuated to feed the wire electrode 1 in an attempt to insert the wire electrode 1 in the feed pipe 5 and in the start hole 26 in the work 8 from the wire feeding port 6A of the upper wire head 6 (step 48).

It is detected and determined whether the operation by the controller has succeeded in inserting the wire electrode in the start hole 26 in the work 8. When the wire electrode 1 is inserted in the start hole 26 of the work 8, the process proceeds to a step 50 (step 49).

When the wire electrode 1 is not inserted in the start hole 26 of the work 8, the number N of tries for insertion is counted (step 51). It is judged whether the insertion be successful or not with the number N of tries for inserting the wire electrode 1 in the start hole 26 being a predetermined number $N_1$ of times such as two times or less. In other words, it is judged whether $N_1 \geq N$ or not (step 52).

When the operation for inserting the wire electrode 1 has resulted in failure, the holder 20 or the feed pipe 5 is slightly lifted up and is lowered again to try the insertion again or the annealing rollers 4 are slightly rotated in the reverse direction to slightly lift up the wire electrode 1 and to lower it again in order to try the insertion when the number N of insertion tries is not greater than the predetermined number $N_2$ of times, e.g., when $N_2 \geq N$ (step 52A). However, when the wire electrode 1 is inserted with the number N of insertion tries being greater than the predetermined number $N_2$ of times but smaller than a predetermined number $N_1$ of times, i.e., $N_1 \geq N > N_2$, the holder 20 and the feed pipe 5 together are lifted up in order to cut off the tip of the wire electrode 1 and to trim the tip of the wire electrode 1, and the process is returned to the step 44 (step 52B).

When the number N of tries for inserting the wire electrode 1 in the start hole 26 is greater than the predetermined number $N_1$ of times, e.g., greater than five times, the process is returned back to the step 41 being based on the assumption that abnormal condition has developed such as worked scraps are clogging, the tip of the wire electrode 1 is bent, or the positioning is not effected correctly for the start hole 26. In this case, the wire electrode 1 is passed through the same start hole or is passed through another start hole when it is perforated in the same work 8. When the operation is carried out to pass the wire electrode 1 in another start hole, it may be tried again to insert the wire electrode 1 in the start hole in which it could not be inserted (step 53).

When the wire electrode 1 is inserted in the start hole 26 of the work 8, i.e., when the controller receives a signal that is produced under the condition where the wire electrode 1 is held by the lead roller 34 on the downstream side of the lower wire head or receives a signal that is produced under the condition where the breakage sensor 33 detects the tensed state of the wire electrode 1 that is drawn by the lead roller 34, the annealing rollers 4 cease to feed the wire electrode 1 in compliance with the instruction from the controller, and the roller opening/closing device is actuated to separate the annealing rollers 4 away from each other in order to release the wire electrode (step 50).

Thereafter, the holder 20 and the feed pipe 5 are moved up to a position shown in FIG. 1 to make it ready to machine the work 8 into a desired machining profile (step 54).

The lead roller 34 arranged on the downstream side of the lower wire head 35 is actuated to draw the wire electrode (step 55).

The wire running system in the automatic wire feeder is set to the wire feeling state, i.e., the guide rollers 18 are moved to their operation positions so as to guide the wire electrode 1, the lead roller 34 arranged on the downstream side of the lower wire head 35 is actuated to draw the wire electrode 1 which is then permitted to run to the machining portion of the work 8. Then, a voltage is applied across the work 8 and the wire electrode 1 such that electric discharge takes place (step 56), the work 8 is machined using the energy of electric discharge, and the work table 21 is actuated to move the wire electrode 1 and the work 8 relative to each other (step 57) so that the work 8 is machined into a predetermined machining profile.

When the work 8 is being machined by the electric discharge machine, the breakage sensor 33 installed in the wire electrode 1 running system monitors the condition in which the wire electrode 1 is being fed. The wire electrode 1 that is broken is detected by the breakage sensor 33, and the detect signal is input to the controller. Upon receipt of a detect signal from the breakage sensor 33, the controller judges whether the wire electrode 1 is being fed properly or is broken (step 58).

As far as the wire electrode 1 is not broken, the operation is continued to feed the wire electrode 1 and the work 8 is machined continuously into a predetermined machining profile (step 59).

The controller judges whether the work 8 is machined by the wire electrode 1 into a predetermined machining profile or not. When the discharge machining into a predetermined machining profile has not been finished, the process returns back to the step 58 to carry out the above-mentioned processing again (step 60).

When the work 8 has been machined by the wire electrode 1 into a predetermined machining profile, the discharge machining is no more continued like the ordinary electric discharge machining. That is, the automatic wire feeder and the electric discharge machine are no more operated, the wire electrode 1 is cut like an ordinary operation to make it ready for carrying out the discharge machining into a next machining profile. That is, when the same work 8 is to be machined into another machining profile, the wire feeding port 6A of the upper wire head 6 is positioned on another start hole for achieving the machining profile. For this purpose, the process is returned back to the step 41. When the same work 8 is not to be machined into another machining profile, the work 8 is exchanged by another work (step 61).

When the wire electrode 1 that is broken is detected by the breakage sensor 33 at the step 58, the following processing is carried out to insert the wire electrode again in the worked slit 27 which is the worked hole at a worked position of the work 8 of a worked profile without returning the wire feeding port 6A of the upper wire head 6 back to the start hole 26 from a position where the wire electrode was broken. That is, upon receipt of a detect signal sent from the breakage sensor 33 as a result of breakage of the wire electrode 1, the controller produces an instruction such that the automatic wire feeder no more feeds the wire electrode 1 (step 62), and actuates the lead roller 34 to draw the wire electrode 1 of the tip side that is broken or, in other words, to draw the wire electrode 1 that is worn out to send it to a predetermined worn wire electrode storage unit (step 63).

Upon receipt of the instruction from the controller, the wire feeding port 6A of the upper wire head 6 which feeds the wire electrode 1 to the work 8 is moved back by a small distance such as about 0.3 mm along the worked profile of discharge machining. That is, the NC apparatus is actuated by the instruction from the controller to move the work table 21 relative to the wire feeding part 6A of the upper wire head 6 of wire electrode 1 along the worked profile (step 64).

Then, the work table 21 is stopped from moving the maintain the wire feeding port 6A of the wire head 6 at rest in an attempt to feed the wire electrode 1 to the worked slit 27 of a worked profile of the work 8. Under this condition, the wire electrode feeding port is opposed to the worked slit 27 of a worked profile at a point that is slightly returned back from a point where the wire electrode 1 was broken. Therefore, there is no need of adjusting their positions (step 65).

Next, the automatic wire feeder is actuated by the instruction from the controller to feed the wire electrode 1 through the feed pipe 5, and the tip of the wire electrode 1 is set to be protruded by a predetermined length beyond the lower end of the feed pipe 5 (steps 66, 67).

Upon receipt of an instruction from the controller, the pair of annealing rollers installed on the holder 20 are brought close to each other by the roller opening/closing device, and the pair of common rollers 15 installed on the holder 24 are brought close to each other by the roller opening/closing device to hold predetermined portions of the wire electrode 1, respectively (step 68).

In response to an instruction from the controller, a voltage is applied across the feeder pin 17 provided for the annealing roller 4 and the feeder pin 17 provided for the common roller 15 in order to flow an electric current into the wire electrode 1 between the annealing rollers 4 and the common rollers 15. That is, the wire electrode is annealed between the annealing rollers 4 and the common rollers 15; i.e., the wire electrode 1 is softened to remove its internal stress and is extended to become straight (step 69).

Then, the cutter 16 provided on the downstream side of the feed pipe 5 is actuated by the cutter operation device to cut and remove the tip of the wire electrode 1; i.e., the tip of the wire electrode 1 is trimmed (step 70).

In response to an instruction from the controller, the roller opening/closing device is actuated to liberate the common rollers 15 from the closely arranged condition, the lower part of the wire electrode 1 is released from the held condition, the automatic wire feeder is actuated to feed the wire electrode 1, the holder 20 is lowered along the guide rods 3 until the lower end of the feed pipe 5 fastened to the holder 20 comes into contact with the pipe stopper 19 as shown in FIG. 2. The holder 20 is then stopped from descending at that position, and the annealing rollers 4 are actuated to feed the wire electrode 1 at a rate that meets the descending rate of the feed pipe 5 (step 71).

The annealing rollers 4 are actuated to deliver the wire electrode 1, in an attempt to insert the wire electrode 1 from the feed pipe 5 and the wire feeding port 6A of the upper wire head 6 into the worked slit 27 of the work 8 at a point returned back from the point of breakage along the worked profile (step 72).

It is detected and determined whether the wire electrode 1 is inserted in the worked slit of a machining profile of the work 8 or not. That is, when the wire electrode 1 is inserted in the worked slit 27 of the work 8, the lead roller 34 grips the wire electrode 1 to draw it. Therefore, the condition in which the lead roller 34 delivers the wire electrode 1 is detected, and the controller proceeds the processing toward a step 77 (step 73) in response to the detect signal.

When the wire electrode 1 is not inserted in the worked slit 27 of the work 8, the number N of tries for insertion operation is counted and is input to the controller (step 74).

The controller determines whether the number N of tries for inserting the wire electrode into the worked slit 27 is not greater than a predetermined number $N_3$ of times, e.g., is not greater than five times to succeed in inserting the wire electrode in the worked slit. That is, the controlled determines if $N_3 \geq N$ or not (step 75).

When the try for inserting the wire electrode 1 has resulted in failure with the number N of tries being not greater than a predetermined number $N_4$ of times, e.g., not greater than two times, i.e., $N_4 \geq N$, the holder 20 or the feed pipe 5 is slightly moved up and is lowered again to try the insertion operation again, or the annealing rollers 4 are slightly rotated in the reverse direction to move the wire electrode 1 up in small amounts and is lowered again to try to insert the wire electrode 1 (step 75A). However, when the wire electrode 1 is not inserted in the worked slit 27 despite the try for inserting the wire electrode is repeated the predetermined number $N_4$ of times but is inserted after the insertion operation is tried more than the above-mentioned number of times which is not greater than predetermined number of times $N_3$, i.e., $N_3 \geq N \geq N_4$, the tip of the wire electrode 1 is cut and is removed to trim the tip of the wire electrode 1. For this purpose, the holder 20 as well as the feed pipe 5 are upwardly moved, and the processing is returned back to the step 68 (step 75B).

When the number N of tries for inserting the wire electrode 1 in the worked slit 27 is greater than the predetermined number $N_3$ of times, e.g., greater than five times, it is presumed that abnormal condition has developed such as the worked scraps are clogging, the tip of the wire electrode 1 is bent, or the set position is deviated relative to the worked slit 27, and the processing is returned back to the step 41. In this case, the wire electrode 1 is passed through the same start hole 26. Or, when another start hole is perforated in the same work 8, the operation is carried out to pass the wire electrode 1 in the another start hole. When the operation is carried out to pass the wire electrode 1 in the another start hole, it may be tried again to insert the wire electrode 1 in the start hole 26 in which it could not be inserted or in the worked slit 27 after the predetermined machining profile has been obtained (step 76).

When the wire electrode 1 is inserted in the worked slit 27 of the work 8, the wire electrode 1 is no more fed by the annealing rollers 4 and is released from the held condition by separating the annealing rollers 4 from each other (step 77).

The holder 20 and the feed pipe 5 are ascended to a position shown in FIG. 1 to make it ready to machine the work 8 into a predetermined machining profile (step 78).

The lead roller 34 arranged on the downstream side of the lower wire head is actuated to hold the wire electrode 1 and to draw it (step 79).

The wire running system in the automatic wire feeder is set to the wire feed condition, i.e., the guide rollers 18 are moved to their operation positions to guide the wire electrode 1, and the wire feeding port 6A of the upper wire head 6 that is feeding the wire electrode 1 to the work 8 is moved back by a small amount along the worked profile of discharge machining at the step 64. Therefore, the work table 21 is operated to return the wire electrode 1 back to the tip of worked slit of machining profile of the work 8, i.e., back to the working point of the work, such that the wire electrode 1 arrives at the working point (steps 80, 81).

The operation of discharge machining is returned back to the step 58 (steps 82, 83) in order to actuate the lead roller disposed on the downstream side of the lower wire head to draw the wire electrode 1, to feed or run the wire electrode 1 to the working portion of the work 8, to apply a voltage across the work 8 and the wire electrode 1 so that an electric discharge will take place enabling the work 8 to be discharge-machined utilizing the energy of the electric discharge, and to move the work table 21 thereby to move the wire electrode 1 and the work 8 relative to each other so that the work 8 is machined into a predetermined machining profile, in an attempt to machine the work 8 using the wire electrode 1.

The aforementioned embodiment has dealt with the case where, when the wire electrode 1 is broken during the electric discharge machining, the wire feeding port 6A of the upper wire head 6 feeding the wire electrode 1 to the work 8 is slightly moved back along the worked profile of discharge machining. However, it is also allowable to try to insert the wire electrode 1 in the worked slit of a machining profile of the work at a position where the wire electrode was broken without moving the wire feeding port 6A of the upper wire head 6 back along the worked profile. In this case, the success rate for feeding the wire electrode 1 becomes slightly lower than that of the operation of the aforementioned embodiment.

What is claimed is:

1. In an electric discharge machine which develops electric discharge by applying a voltage across a work fastened to a work table and a wire electrode that is successively delivered from a wire feeding port of a wire head via a wire electrode feeding system, in order to machine said work into a predetermined machining profile utilizing the energy of electric discharge, a method of automatically feeding the wire to the electric discharge machine to insert said wire electrode in a start hole that has been perforated in advance in said work via a feed pipe mounted on a holder that reciprocally moves on guide rods provided in the head of said electric discharge machine, comprising:

a step for detecting the breakage of said wire electrode during the electric discharge machining using a breakage sensor that is provided in said wire electrode feeding system and that detects the condition of feeding said wire electrode;

a step for stopping the relative movement of said work table and said wire head in response to the breakage of said wire electrode that is detected by said breakage sensor during the electric discharge machining;

a step for taking up and removing said wire electrode of the broken side;

a step for annealing said wire electrode of the feeding side by causing an electric current to flow therethrough to extend said wire electrode straight by eliminating internal stresses which cause curving and curling;

a step for cutting and removing the tip of said wire electrode annealed in order to trim the tip of said wire electrode by causing the tip to hang down vertically;

a step for moving down the tip of said feed pipe to said wire head and for moving down said annealed wire electrode while feeding said wire electrode thus annealed to meet the descending speed of said feed pipe;

a step for delivering said wire electrode to thread said wire electrode in said worked slit of said work at a point where the wire electrode was broken;

a step for drawing said wire electrode that has passed through said worked slit to extend said wire electrode under the tensed condition;

a step for upwardly moving said feed pipe to return said feed pipe to the initial position; and a step for developing electric discharge by applying a voltage across said wire electrode and said work in order to discharge-machine said work again into a predetermined machining profile using the energy of electric discharge.

2. A method of automatically feeding wire to an electric discharge machine according to claim 1, wherein in a step for delivering said wire electrode to insert said wire electrode in said worked slit of said work at a point where the wire was broken, said wire electrode is slightly moved back in response to the failure in trying to insert said wire electrode in said worked slit, and said wire electrode is delivered to try again to insert said wire electrode in said worked slit.

3. A method of automatically feeding wire to an electric discharge machine according to claim 1, wherein in a step for delivering said wire electrode to insert said wire electrode in said worked slit of said work at a point where the wire was broken, said wire electrode is slightly moved back and the tip of said wire electrode is cut and is removed in response to the failure in trying to insert said wire electrode in said worked slit, and said wire electrode is delivered to try again to insert said wire electrode in said worked slit.

4. In an electric discharge machine which develops electric discharge by applying a voltage across a work fastened to a work table and a wire electrode that is successively delivered from a wire feeding port of a wire head via a wire electrode feeding system, in order to machine said work into a predetermined machining profile utilizing the energy of electric discharge, a method of automatically feeding the wire to the electric discharge machine to insert said wire electrode in a start hole that has been perforated in advance in said work from said wire feeding port of said wire head via a feed pipe mounted on a holder that reciprocally moves on guide rods provided in the head of said electric discharge machine, comprising:

a step for detecting the breakage of said wire electrode during the electric discharge machining using a breakage sensor that is provided in said wire electrode feeding system and that detects the condition of feeding said wire electrode;

a step for stopping the relative movement of said work table and said wire head in response to the breakage of said wire electrode that is detected by said breakage sensor during the electric discharge machining;

a step for taking up and removing said wire electrode of the broken side;

a step for annealing said wire electrode of the feeding side by causing an electric current to flow therethrough to extend said wire electrode straight by eliminating internal stresses which cause curving and curling;

a step for cutting and removing the tip of said wire electrode annealed in order to trim the tip of said wire electrode by causing the tip to hang down vertically;

a step for moving down the tip of said feed pipe to said wire head and for moving down said annealed wire electrode while feeding said wire electrode thus annealed to meet the descending speed of said feed pipe:

a step for moving back said work table fastening said work relative to said wire feeding port of said wire head so that said wire feeding port of said wire head is moved back from the worked slit at the point where the wire is broken by a small distance along the worked profile;

a step for delivering said wire electrode to thread it in said worked slit at a position moved back from the point of said work where the wire is broken along the worked profile;

a step for drawing said wire electrode that has passed through said worked slit to extend said wire electrode under the tensed condition;

a step for upwardly moving said feed pipe to return said feed pipe to the initial position;

a step for processing said wire electrode to the portion of discharge machining along said worked slit that has been formed already in said work; and a step for developing electric discharge by applying a voltage across said wire electrode and said work in order to discharge-machine said work again into a predetermined machining profile using the energy of electric discharge.

5. A method of automatically feeding wire to an electric discharge machine according to claim 4, wherein in a step for delivering said wire electrode to insert said wire electrode in said worked slit cf said work at a point where the wire was broken, said wire electrode is slightly moved back in response to the failure in trying to insert said wire electrode in said worked slit, and said wire electrode is delivered to try again to insert said wire electrode in said worked slit.

6. A method of automatically feeding wire to an electric discharge machine according to claim 4, wherein in a step for delivering said wire electrode to insert said wire electrode in said worked slit of said work at a point where the wire was broken, said wire electrode is slightly moved back and the tip of said wire electrode is cut and is removed in response to the failure in trying to insert said wire electrode in said worked slit, and said wire electrode is delivered to try again to insert said wire electrode in said worked slit.

7. In an electric discharge machine which develops electric discharge by applying a voltage across a work fastened to a work table and a wire electrode that is successively delivered from a wire feeding port of a wire head via a wire electrode feeding system, in order to machine said work into a predetermined machining profile utilizing the energy of electric discharge, a method of automatically feeding the wire to the electric discharge machine to insert said wire electrode in a start hole that has been perforated in advance in said work via a feed pipe mounted on a holder that reciprocally moves on guide rods provided in the head of said electric discharge machine, comprising:

- a step for detecting the breakage of said wire electrode during the electric discharge machining using a breakage sensor that is provided in said wire electrode feeding system and that detects the condition of feeding said wire electrode;
- a step for stopping the relative movement of said work table and said wire head in response to the breakage of said wire electrode that is detected by said breakage sensor during the electric discharge machining;
- a step for taking up and removing said wire electrode of the broken side using a lead roller that is provided for said electric discharge machine at a position on the downstream side of said work, for holding said wire electrode of the feeding side by a pair of annealing rollers provided for said holder and by a pair of common rollers which are mounted on a support member provided on said head and which are arranged under said annealing rollers;
- a step for annealing said wire electrode by passing an electric current to said wire electrode positioned between said annealing rollers and said common rollers via feeder pins provided for said annealing rollers and said common rollers to extend said wire electrode straight by eliminating internal stresses causing curving and curling;
- a step for cutting and removing the tip of said wire electrode thus annealed by actuating a cutter provided on said support member in order to trim the tip of said wire electrode by causing the tip to hang down vertically;
- a step for moving down said holder along said guide rods until the tip of said feed pipe reaches said wire rod and for moving down said wire electrode while feeding said wire electrode thus annealed by actuating said annealing rollers to meet the descending speed of said feed pipe;
- a step for delivering said wire electrode by actuating said annealing rollers to thread it in said worked slit of said work at a point where the wire was broken;
- a step for drawing said wire electrode that has passed through said worked slit by actuating said lead roller to extend said wire electrode under the tensed condition;
- a step for upwardly moving said holder along said guide rods to raise said feed pipe until it returns to the initial position; and
- a step for developing electric discharge by applying a voltage across said wire electrode and said work in order to discharge-machine said work again into a predetermined machining profile using the energy of electric discharge.

8. A method of automatically feeding wire to an electric discharge machine according to claim 7, wherein in a step for delivering said wire electrode to insert said wire electrode in said worked slit of said work at a point where the wire was broken, said wire electrode is slightly moved back by actuating said annealing rollers in response to the failure in trying to insert said wire electrode in said worked slit, and said wire electrode is delivered by actuating said annealing rollers to try again to insert said wire electrode in said worked slit at said position that is moved back.

9. A method of automatically feeding wire to an electric discharge machine according to claim 7, wherein in a step for delivering said wire electrode to insert said wire electrode in said worked slit of said work at a point where the wire was broken, said wire electrode is slightly moved back by actuating said annealing rollers and the tip of said wire electrode is cut and is removed by actuating said cutter in response to the failure in trying to insert said wire electrode in said worked slit, and said wire electrode is delivered by actuating said annealing rollers to try again to insert said wire electrode in said worked slit at said position that is moved back.

10. In an electric discharge machine which develops electric discharge by applying a voltage across a work fastened to a work table and a wire electrode that is successively delivered from a wire feeding port of a wire head via a wire electrode feeding system, in order to machine said work into a predetermined machining profile utilizing the energy of electric discharge, a method of automatically feeding the wire to the electric discharge machine to insert said wire electrode in a start hole that has been perforated in advance in said work from said wire feeding port of said wire head via a feed pipe mounted on a holder that reciprocally moves on guide rods provided in the head of said electric discharge machine, comprising:

- a step for detecting the breakage of said wire electrode during the electric discharge machining using a breakage sensor that is provided in said wire electrode feeding system and that detects the condition of feeding said wire electrode;
- a step for stopping the relative movement of said work table and said wire head in response to the breakage of said wire electrode that is detected by said breakage sensor during the electric discharge machining;
- a step for taking up and removing said wire electrode of the broken side by actuating a lead roller that is provided for said electric discharge machine at a position on the downstream side of said work, for holding said wire electrode of the feeding side by a pair of annealing rollers provided for said holder and by a pair of common rollers which are mounted on a support member provided on said head and which are arranged under said annealing rollers;
- a step for annealing said wire electrode by passing an electric current to said wire electrode positioned between said annealing rollers and said common rollers via feeder pins provided for said annealing rollers and said common rollers to extend said wire electrode straight by eliminating internal stresses causing curving and curling;
- a step for cutting and removing the tip of said wire electrode thus annealed by actuating a cutter provided on said support member in order to trim the tip of said wire electrode by causing the tip to hang down vertically;
- a step for moving down said holder along said guide rods until the tip of said feed pipe reaches said wire rod and for moving down said wire electrode while feeding said wire electrode thus annealed by actuating said annealing rollers to meet the descending speed of said feed pipe;

a step for moving back said work table fastening said work relative to said wire feeding port of said wire head such that said wire feeding port of said wire head is moved back by a small distance from the worked slit at a point where the wire was broken along the worked profile;

a step for delivering said wire electrode by actuating said annealing rollers to thread said wire electrode in said worked slit of said work at a position moved back from the point where the wire was broken along the worked profile;

a step for drawing said wire electrode that has passed through said worked slit by actuating said lead roller to extend said wire electrode under the tensed condition;

a step for upwardly moving said holder along said guide rods to raise said feed pipe until it returns to the initial position;

a step for forwardly moving said work table to proceed said wire electrode to the discharge machining portion along said worked slit that has been formed already in said work; and a step for developing electric discharge by applying a voltage across said wire electrode and said work in order to discharge-machine said work again into a predetermined machining profile using the energy of electric discharge.

11. A method of automatically feeding wire to an electric discharge machine according to claim 10, wherein in a step for delivering said wire electrode to insert said wire electrode in said worked slit of said work at a point where the wire was broken, said wire electrode is slightly moved back by actuating said annealing rollers in response to the failure in trying to insert said wire electrode in said worked slit, and said wire electrode is delivered by actuating said annealing rollers to try again to insert said wire electrode in said worked slit.

12. A method of automatically feeding wire to an electric discharge machine according to claim 10, wherein in a step for delivering said wire electrode to insert said wire electrode in said worked slit of said work at a position where the wire was broken, said wire electrode is lightly moved back by actuating said annealing rollers and the tip of said wire electrode is cut and is removed by actuating said cutter in response to the failure in trying to insert said wire electrode in said worked slit, and said wire electrode is delivered by actuating said annealing rollers to try again to insert said wire electrode in said worked slit.

* * * * *